United States Patent [19]

Iwata et al.

[11] Patent Number: 4,742,102
[45] Date of Patent: May 3, 1988

[54] POLYSTYRENE COMPOSITIONS

[75] Inventors: Nobutoshi Iwata, Kawasaki; Hisanori Kato, Tokyo, both of Japan

[73] Assignee: Nippon Steel Chemical Co., Ltd., Tokyo, Japan

[21] Appl. No.: 890,031

[22] Filed: Jul. 28, 1986

[30] Foreign Application Priority Data

Jul. 31, 1985 [JP]  Japan .................. 60-170056

[51] Int. Cl.$^4$ ............................................. C08K 5/10
[52] U.S. Cl. ..................... 524/317; 524/505; 524/521; 524/523; 524/562; 524/565
[58] Field of Search ............... 524/317, 505, 565, 562, 524/521, 523

[56] References Cited

U.S. PATENT DOCUMENTS

| | | | |
|---|---|---|---|
| 2,776,268 | 1/1957 | Morrill et al. | 524/317 |
| 3,983,263 | 9/1976 | Weiss et al. | 524/317 |
| 4,115,334 | 9/1978 | Gerow | 524/317 |
| 4,144,214 | 3/1979 | Corbacella | 524/317 |
| 4,596,727 | 6/1986 | Higgins et al. | 428/36 |

FOREIGN PATENT DOCUMENTS

| | | | |
|---|---|---|---|
| 0023246 | 3/1974 | Japan | 524/317 |
| 0061648 | 6/1978 | Japan | 524/317 |
| 60-44536 | 3/1985 | Japan . | |

*Primary Examiner*—Herbert J. Lilling
*Attorney, Agent, or Firm*—Armstrong, Nikaido, Marmelstein & Kubovcik

[57] ABSTRACT

Styrene polymer and copolymer compositions containing both glycerin fatty acid monoester-alkylene oxide adducts and glycerin fatty acid monoesters as antistatic agents produce prolonged antistatic effects unaffected by water washing, showing a resistivity of $10^9$–$10^{10}\Omega$, without losing the transparency and mechanical strengths inherent in styrene polymers and copolymers.

10 Claims, No Drawings

POLYSTYRENE COMPOSITIONS

BACKGROUND OF THE INVENTION

1. Field of the Invention

This invention relates to polystyrene compositions with excellent antistatic properties.

2. Description of the Prior Art

Styrene polymers and copolymers are used as packaging containers for their ease of molding and fabrication. Some of them, such as polystyrene, styrene-butadiene block copolymers, styrene-acrylonitrile copolymers, and styrene-methyl methacrylate copolymers are highly transparent and are used in a variety of packaging containers where transparency counts.

These styrene polymers and copolymers, however, are themselves insulators which tend to accumulate static charges; hence, they have disadvantages that they tend to attract dust or produce arcing to persons touching them.

Of the methods hitherto practiced to overcome such disadvantages, one is to coat or impregnate the articles made from styrene polymers and copolymers with antistatic agents and another is to incorporate antistatic agents mechanically into these styrene polymers and copolymers.

The former method produces an excellent antistatic effect, but the antistatic agent on the surface comes off when the surface is polished or washed. Therefore, a problem with the method is a lack of prolonged antistatic effect and another is poor resistance to water washing. Moreover, an extra operation, at additional cost, of coating or impregnating the articles with antistatic agents becomes necessary.

The latter method can exhibit an antistatic performance which is long-lasting and unaffected by water washing. On the other hand, the antistatic agent incorporated into the polymers sometimes bleeds out to mar the surface. This becomes a serious problem particularly in the cases where the polymers are applied to packaging containers in which the transparency counts.

For inhibition of the blooming, a number of proposals have been made on the use of the following additives: nonionic antistatic agents of high molecular weights, amphoteric antistatic agents, and metal-anionic antistatic agent adducts; ethoxylated amines as antistatic agents (U.S. Pat. No. 4,393,176); organic antistatic agents such as amines, amides, esters, and alcohols in combination with lithium compounds [Japanese Patent Laid open No. 60-44536 (1985)].

The addition of these antistatic agents as proposed, however, is expected to be not very effective with polystyrenes for producing a strong antistatic effect and inhibiting the blooming over an extended period of time and much less effective against rubber-modified polystyrenes.

SUMMARY OF THE INVENTION

The object of this invention is to provide polystyrene compositions which can remain antistatic over an extended period while little affected by water washing and show a resistivity on the order of $10^9$–$10^{10}\Omega$ without losing the properties inherent in styrene polymers and copolymers such as transparency and mechanical strengths.

The polystyrene compositions of this invention are prepared by blending styrene polymers and copolymers with glycerin fatty acid monoester-alkylene oxide adducts and glycerin fatty acid monoesters as antistatic agents.

DETAILED DESCRIPTION OF THE INVENTION

The glycerin fatty acid monoester-alkylene oxide adducts of this invention are indicated by formula (I) where $R_1$ is a saturated or unsaturated higher alkyl group, preferably containing 11 to 21 carbon atoms, X is an alkylene group with 2 and/or 3 carbon atoms, l and m are integers 0 to 5, and l+m is 1 to 5. The compounds of formula (I) include glycerin

monostearate-ethylene oxide (2) adduct, glycerin monostearate-ethylene oxide (3) adduct, glycerin monopalmitate-propylene oxide (1) adduct, glycerin monomyristate-ethylene oxide (5) adduct, and glycerin monolinoleate-ethylene oxide (2) adduct.

The glycerin fatty acid monoesters of this invention are indicated by formula (II) where $R_2$ is a saturated or unsaturated higher alkyl group, preferably containing 11 to 21 carbon atoms. The compounds of formula (II)

include glycerin monooleate, glycerin monolinoleate, and glycerin monopalmitate.

In accordance with this invention, the use of compounds of formula (III), in combination with the compounds of both formula (I) and formula (II), not only effects homogeneous mixing of these additives with the polymer but also improves the antistatic and anti-blooming effects by virtue of their good solvent effect.

In the compounds of formula (III), $R_3$ is a saturated or unsaturated higher alkyl group, preferably containing 7 to 21 carbon atoms, more preferably 11 to 17, Y is an atomic group of —$CH_2O$— or —COO—, n is an integer 0 to 10, preferably 0 to 5. The compounds of formula (III) are alcohols when Y is —$CH_2O$— and n is 0; ethers when Y is —$CH_2O$— and n is 1 to 10; fatty acids when Y is —COO— and n is 0; and esters when Y is —COO— and n is 1 to 10. They are, for example, oleyl alcohol, oleic acid, and oleic acid-ethylene oxide (1) adduct.

The compounds of either formula (I) or formula (II) can singly produce some antistatic effect, but addition of greater amounts required to attain the desired level of antistatic effect will result in blooming which brings out white powders on the surface of the articles. The two compounds need to be used together. In combination, they can improve both the antistatic and the anti-blooming effects. The compounds of formula (III) alone do not produce the antistatic effect, but in combination with the compounds of both formula (I) and formula (II), they not only enhance and prolong the antistatic effect but also inhibit the blooming, thus exhibiting an improved overall antistatic performance.

To each 100 parts by weight of styrene polymers and copolymers are added the compounds of formulas (I), (II), and (III) in amounts of 0.1 to 10, 0.1 to 10, and 0 to 10 parts by weight respectively, preferably each 0.1 to 5 parts by weight. The sum of these compounds is normally 0.3 to 15 parts by weight, preferably 1 to 10 parts by weight, per 100 parts by weight of styrene polymers and copolymers. The ratios by weight of the compounds are chosen as follows: (I)/(II)=9/1–2/8, preferably 3/1–1/2; (I)+(II)/(III)=2/8–9/1, preferably 1/2–5/1. A lesser amount of the compound of formula (III) does not yield a homogeneous solution of these compounds.

The styrene polymers and copolymers of this invention can be any which is applicable as packaging materials, but they should preferably be materials of high transparency as this invention aims at improving the antistatic effect without degrading the mechanical strengths and transparency. Examples of such transparent materials are polystyrene, styrene-butadiene block copolymers, styrene-acrylonitrile copolymers, and styrene-methyl methacrylate copolymers. Particularly desirable are block copolymers prepared from 80–40 parts by weight, preferably 70–60 parts by weight, of alkenylbenzenes such as styrene and 20–60 parts by weight, preferably 30–40 parts by weight, of dienes such as butadiene with the use of organolithium polymerization initiators and polymer compositions containing such copolymers. Examples are linear or branched styrene-butadiene block copolymers represented by the following formulas (IV) to (VII):

$$(S-B)_n \quad (IV)$$

$$S(B-S)_n \quad (V)$$

$$B(S-B)_n \quad (VI)$$

$$Z\{(S-B)_n\}_d \quad (VII)$$

where S is a styrene block, B a butadiene block, n an integer 1 to 5, Z the residue of a polyfunctional coupling agent used for the preparation of radial teleblock copolymers, and d the number of the functional groups of the polyfunctional coupling agent and an integer of 3 or more. The styrene-butadiene block copolymers can be used blended with styrene-acrylonitrile copolymers, styrene-methyl methacrylate copolymers, and other transparent styrene polymers and copolymers, but the proportion of the components to be blended should be kept within a range not affecting the transparency, or at most 90% by weight.

The polystyrene compositions of this invention can be prepared by blending a styrene polymer and/or copolymer in powder or pellet with the compounds of formulas (I), (II) and (III) at specified ratios and converted directly into the products by such means as injection molding and extrusion molding or the blends first obtained are made into pellets suitable as molding materials for injection and extrusion. Each compound may be blended separately into the polymer, but it is preferable to prepare a solution of the compounds of formulas (I) and (II) in the compound of foumula (III) in advance and blend such a solution into the polymer. It is of course possible, during this step, to incorporate other known additives such as colorants, pigments, antioxidants, ultraviolet light absorbers, plasticizers, lubricants, and anti-blocking agents.

As described above, the polystyrene compositions of this invention can produce prolonged antistatic effects unaffected by water washing and attain a resistivity of $10^9$–$10^{10}\Omega$ which is required, for example, for packaging of integrated circuit elements without losing the transparency and mechanical strengths inherent in styrene polymers and copolymers.

DESCRIPTION OF THE PREFERRED EMBODIMENTS

This invention will be illustrated with reference to examples and comparative examples. The percentage or weight in the examples is by weight unless otherwise specified.

Examples 1–6 and Comparative Examples 1–5

A styrene-butadiene block copolymer of formula (VII) containing 75% styrene and 25% butadiene (K-Resin KR 05, from Phillips 66 Company), 100 parts, was mixed with 2 parts of one of A to J as an antistatic agent, kneaded and pelletized by a 40 mm-diameter extruder, and then formed into test pieces 1 mm thick by a 5-ounce injection molding machine.

A: A blend consisting of;
  (1) glycerin monostearate-ethylene oxide (2) adduct: 35 parts
  (2) glycerin monooleate: 15 parts
  (3) oleyl alcohol: 50 parts B: A blend consisting of;
  (1) glycerin monostearate-ethylene oxide (2) adduct: 40 parts
  (2) glycerin monooleate: 20 parts
  (3) oleic acid-ethylene oxide (1) adduct: 40 parts C: A blend consisting of;
  (1) glycerin monostearate-ethylene oxide (3) adduct: 40 parts
  (2) glycerin monooleate: 20 parts
  (3) oleyl alcohol: 40 parts D: A blend consisting of;
  (1) glycerin monostearate-ethylene oxide (2) adduct: 15 parts
  (2) glycerin monooleate: 35 parts
  (3) oleyl alcohol: 50 parts E: A blend consisting of;
  (1) glycerin monostearate-ethylene oxide (2) adduct: 50 parts
  (2) glycerin monooleate: 50 parts F: A blend consisting of;
  (1) glycerin monooleate-ethylene oxide (2) adduct: 40 parts
  (2) glycerin monooleate: 20 parts
  (3) oleyl alcohol: 40 parts G: A blend consisting of;
  (1) glycerin distearate-ethylene oxide (2) adduct: 15 parts
  (2) glycerin monooleate: 35 parts
  (3) oleyl alcohol: 50 parts H: Glycerin monostearate
I: Glycerin monooleate
J: N,N-Bis(2-hydroxyethyl)stearylamine
K: No antistatic agent added The test pieces were left stand in a test chamber controlled at 23° C. and 50% humidity and measured for the surface resistivity and blooming at specified time intervals. The results are shown in Table 1. The surface resistivity was determined with the aid of a surface resistivity tester (Model SM-10E, from Toa Electronics, Ltd.) and the blooming was evaluated by visual observation and rated as follows: O, transparent with no blooming; Δ, blooming in part; X, opaque with blooming.

The properties determined on the test pieces in Examples 1 and 2 and Comparative Example 4 are shown in Table 2.

tested for the surface resistivity and blooming similarly. The results are shown in Table 3.

What is claimed is:

1. A polystyrene composition comprising a blend of,
   (a) a styrene homopolymer or copolymer;
   (b) an adduct of a glycerin fatty acid monoester and alkylene oxide, of formula (I)

TABLE 1

| | Antistatic agent | Surface resistivity (Ω) after the passage of following days | | | | | | Blooming after the passage of following days | | | | | |
|---|---|---|---|---|---|---|---|---|---|---|---|---|---|
| | | 3 | 7 | 30 | 60 | 90 | 180 | 3 | 7 | 30 | 60 | 90 | 180 |
| Example | | | | | | | | | | | | | |
| 1 | A | $7 \times 10^{10}$ | $9 \times 10^9$ | $5 \times 10^9$ | $4 \times 10^9$ | $4 \times 10^9$ | $4 \times 10^9$ | O | O | O | O | O | O |
| 2 | B | $7 \times 10^{10}$ | $8 \times 10^9$ | $4 \times 10^9$ | $4 \times 10^9$ | $4 \times 10^9$ | $3 \times 10^9$ | O | O | O | O | O | Δ |
| 3 | C | $2 \times 10^{11}$ | $5 \times 10^{10}$ | $8 \times 10^9$ | $7 \times 10^9$ | $7 \times 10^9$ | $7 \times 10^9$ | O | O | O | O | Δ | Δ |
| 4 | D | $4 \times 10^{11}$ | $1 \times 10^{11}$ | $5 \times 10^{10}$ | $3 \times 10^{10}$ | $3 \times 10^{10}$ | $3 \times 10^{10}$ | O | O | O | O | O | O |
| 5 | E | $8 \times 10^{10}$ | $1 \times 10^{10}$ | $5 \times 10^9$ | $4 \times 10^9$ | $4 \times 10^9$ | $4 \times 10^9$ | O | O | Δ | Δ | Δ | Δ |
| 6 | F | $4 \times 10^{11}$ | $1 \times 10^{11}$ | $8 \times 10^{10}$ | $6 \times 10^{10}$ | $6 \times 10^{10}$ | $6 \times 10^{10}$ | O | O | O | O | O | O |
| Comparative example | | | | | | | | | | | | | |
| 1 | H | $4 \times 10^{11}$ | $2 \times 10^{11}$ | $8 \times 10^{10}$ | $8 \times 10^{10}$ | $8 \times 10^{10}$ | $5 \times 10^{10}$ | O | Δ | X | X | X | X |
| 2 | I | $6 \times 10^{11}$ | $6 \times 10^{11}$ | $2 \times 10^{11}$ | $2 \times 10^{11}$ | $2 \times 10^{11}$ | $2 \times 10^{11}$ | O | O | Δ | X | X | X |
| 3 | J | $4 \times 10^{11}$ | $4 \times 10^{11}$ | $2 \times 10^{11}$ | $2 \times 10^{11}$ | $2 \times 10^{11}$ | $2 \times 10^{11}$ | O | O | Δ | X | X | X |
| 4 | K | $9 \times 10^{17}$ | $9 \times 10^{17}$ | $9 \times 10^{17}$ | $9 \times 10^{17}$ | $9 \times 10^{17}$ | $9 \times 10^{17}$ | O | O | O | O | O | O |
| 5 | G | $4 \times 10^{11}$ | $5 \times 10^{10}$ | $3 \times 10^{10}$ | $3 \times 10^{10}$ | $3 \times 10^{10}$ | $3 \times 10^{10}$ | O | Δ | Δ | Δ | X | X |

TABLE 2

| | General properties | | | | | |
|---|---|---|---|---|---|---|
| | Tensile strength kg·cm² ASTM D638 | Elongation % ASTM D638 | Izod impact Strength (notched) kg·cm/cm ASTM D256 | Heat deflection temperature °C. ASTM D648 | Light transmittance % ASTM D1006 | Haze (3 mm plate) ASTM D1006 |
| Example | | | | | | |
| 1 | 220 | 140 | 2.1 | 68 | 91 | 2.0 |
| 2 | 225 | 150 | 2.1 | 68 | 91 | 2.0 |
| Comparative example | | | | | | |
| 4 | 230 | 140 | 2.1 | 68 | 91 | 2.0 |

Examples 7-9 and Comparative Examples 6-8

The branched styrene-butadiene block copolymer used in the preceding examples was blended with a polystyrene (Estyrene G-32, from Nippon Steel Chemical Co., Ltd.) at a ratio by weight of 8:2 and 100 parts of the blend was mixed with 2 parts of A, B, or C used in Examples 1-3, formed into test pieces as above, and tested for the surface resistivity and blooming at specified time intervals. The results are shown in Table 3.

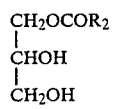

$$\begin{array}{l} CH_2OCOR_1 \\ | \\ CHO(XO)_lH \\ | \\ CH_2O(XO)_mH \end{array} \qquad (I)$$

where $R_1$ is a saturated or unsaturated alkyl group containing 11-21 carbon atoms, each X is independently an alkylene group of 2-3 carbon atoms, and l and m are integers such that l+m is 1 to 5; and
(c) a glycerin fatty acid monoester of formula (II)

TABLE 3

| | Antistatic agent | Surface resistivity (Ω) after the passage of following days | | | | | | Blooming after the passage of following days | | | | | |
|---|---|---|---|---|---|---|---|---|---|---|---|---|---|
| | | 3 | 7 | 30 | 60 | 90 | 180 | 3 | 7 | 30 | 60 | 90 | 180 |
| Example | | | | | | | | | | | | | |
| 7 | A | $2 \times 10^{11}$ | $4 \times 10^{10}$ | $8 \times 10^9$ | $7 \times 10^9$ | $7 \times 10^9$ | $7 \times 10^9$ | O | O | O | O | O | O |
| 8 | B | $3 \times 10^{11}$ | $6 \times 10^{10}$ | $9 \times 10^9$ | $9 \times 10^9$ | $9 \times 10^9$ | $9 \times 10^9$ | O | O | O | O | O | O |
| 9 | C | $4 \times 10^{11}$ | $1 \times 10^{11}$ | $2 \times 10^{10}$ | $1 \times 10^{10}$ | $1 \times 10^{10}$ | $1 \times 10^{10}$ | O | O | O | O | O | O |
| Comparative example | | | | | | | | | | | | | |
| 6 | H | $8 \times 10^{11}$ | $6 \times 10^{11}$ | $1 \times 10^{11}$ | $9 \times 10^{10}$ | $9 \times 10^{10}$ | $9 \times 10^{10}$ | O | Δ | Δ | X | X | X |
| 7 | I | $7 \times 10^{11}$ | $7 \times 10^{11}$ | $4 \times 10^{11}$ | $4 \times 10^{11}$ | $4 \times 10^{11}$ | $4 \times 10^{11}$ | O | O | Δ | Δ | X | X |
| 8 | J | $8 \times 10^{11}$ | $7 \times 10^{11}$ | $3 \times 10^{11}$ | $1 \times 10^{11}$ | $1 \times 10^{11}$ | $1 \times 10^{11}$ | O | O | O | Δ | X | X |

For evaluation of the antistatic and anti-blooming effects in Examples 7-9, glycerin monostearate (H), glycerin monooleate (I), or N,N-Bis(2-hydroxyethyl)-stearylamine (J) alone was used in Comparative Example 6, 7, or 8, and the test pieces were prepared and $$\begin{array}{l} CH_2OCOR_2 \\ | \\ CHOH \\ | \\ CH_2OH \end{array} \qquad (II)$$

where $R_2$ is a saturated or unsaturated alkyl group containing 11–21 carbon atoms.

2. A polystyrene composition according to claim 1 wherein a total of 0.3 to 15 parts by weight of the compounds of formula (I) and (II) is blended with 100 parts by weight of the styrene homopolymer or copolymer.

3. A polystyrene composition according to claim 1 wherein the compound of formula (I) is blended with the compound of formula (II) at a weight ratio of 9/1 to 2/8.

4. A polystyrene composition according to claim 1 wherein the compounds of formulas (I) and (II) are blended with a compound of formula (III) where $R_3$ is a saturated or unsaturated higher alkyl group containing 7 to 21 carbon atoms, X is an alkylene $$R_3Y(XO)_nH \qquad (III)$$

group with 2 and/or 3 carbon atoms, Y is an atomic group of either —$CH_2O$— or —$COO$—, and n is an integer 0 to 10.

5. A polystyrene composition according to claim 4 wherein the compounds of formulas (I), (II), and (III) are each added at a rate of 0.5 to 5 parts by weight to 100 parts by weight of the styrene homopolymer or copolymer.

6. A polystyrene composition according to claim 4 wherein the ratio by weight of the sum of the compounds of formulas (I) and (II) to the compound of formula (III) is 2/8 to 9/1.

7. A polystyrene composition according to claim 1 wherein component (a) is a block copolymer of an alkenylbenzene and a diene.

8. A polystyrene composition according to claim 1 wherein component (a) is a branched styrene-butadiene block copolymer.

9. A polystyrene composition according to claim 1 wherein the polymer is composed of a styrene-butadiene block copolymer and 90% by weight or less of another styrene polymer and/or copolymer.

10. A polystyrene composition according to claim 9 wherein the other styrene polymer and/or copolymer to be used with the styrene-butadiene block copolymer is a polystyrene, a styrene-acrylonitrile copolymer, or a styrene-methyl methacrylate copolymer.

* * * * *